United States Patent
Wang et al.

(10) Patent No.: US 7,308,352 B2
(45) Date of Patent: *Dec. 11, 2007

(54) ENHANCED BRAKING SYSTEM AND METHOD

(75) Inventors: Xiaobin Wang, Alpharetta, GA (US); Gerald Brown, Cedarville, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/902,207

(22) Filed: Jul. 29, 2004

(65) Prior Publication Data
US 2005/0065693 A1    Mar. 24, 2005

Related U.S. Application Data

(60) Provisional application No. 60/493,215, filed on Aug. 7, 2003.

(51) Int. Cl.
*G06F 7/70* (2006.01)
(52) U.S. Cl. .......................... 701/70; 701/78; 701/84; 318/139; 318/375; 318/432
(58) Field of Classification Search .................. 701/70, 701/78, 84, 87, 89; 318/139, 375, 432, 39–61, 318/63, 64, 376, 379–381, 433–434
See application file for complete search history.

(56) References Cited

U.S. PATENT DOCUMENTS

| | | | |
|---|---|---|---|
| 5,351,775 A | 10/1994 | Johnston | |
| 5,983,149 A | 11/1999 | Tate | |
| 6,150,780 A | 11/2000 | Young | |
| 6,249,733 B1 | 6/2001 | Smith | |
| 6,299,263 B1 | 10/2001 | Uematsu | |
| 6,412,886 B1 | 7/2002 | Abe et al. | |
| 7,034,476 B2 * | 4/2006 | Wang et al. ................ | 318/139 |

FOREIGN PATENT DOCUMENTS

| CA | 000002439828 A1 | 9/2002 |
|---|---|---|
| EP | 502951 | 9/1992 |

* cited by examiner

*Primary Examiner*—Gertrude A. Jeanglaude

(57) ABSTRACT

Certain exemplary embodiments can provide for automatic power control and/or torque boost for retarding a machine that considers a machine weight and/or a machine slope. The automatic power control and/or torque boost can provide a control margin under retard. Certain exemplary embodiments can control, or attempt to control, a speed of the machine at less than a maximum safe speed.

25 Claims, 4 Drawing Sheets

ENHANCED BRAKING SYSTEM AND METHOD

CROSS-REFERENCES TO RELATED APPLICATIONS

This application claims priority to, and incorporates by reference herein in its entirety, pending U.S. Provisional Patent Application Ser. No. 60/493,215 filed 7 Aug. 2003.

BACKGROUND

For a machine comprising at least one electric motor, a retard torque and/or power can be used to slow motion of the machine. Slowing the machine can depend upon a plurality of factors such as machine weight, a slope of a path of the machine, and/or the available retard torque and/or power. Often, machines can be operated with a retard torque and/or power control that does not allow a sufficient control margin in certain situations.

U.S. Pat. No. 6,299,263 (Uematsu), which is incorporated by reference herein in its entirety, allegedly recites an "automatic retarder controller for a vehicle, which can prevent overheating, and can more precisely control the vehicle speed to remain constant. For this purpose, in the automatic retarder controller which is mounted on a load-carrying vehicle together with a cooled retarder (31) for exerting a braking force in response to a driving signal, and which automatically controls the driving signal so that the slope descending speed of the vehicle remains nearly constant, a detector for detecting the loading weight of the vehicle is included, and the controller impresses the gain corresponding to the detected loading weight upon the driving signal while the controller controls the vehicle speed to remain constant." See Abstract.

U.S. Pat. No. 6,249,733 (Smith), which is incorporated by reference herein in its entirety, allegedly recites an "automatic control for operating an engine retarder, service brakes, and an automatic transmission associated with earth moving equipment is provided. The automatic control monitors engine speed and responsively produces control signals to maintain engine speed within predetermined limit." See Abstract.

U.S. Pat. No. 6,150,780 (Young), which is incorporated by reference herein in its entirety, allegedly recites torque "is distributed by calculating first and second torque commands using a requested torque and a ratio of speeds of first and second wheels and limiting them in accordance with respective torque command approved ranges and approved change rates; converting the limited torque commands to horsepower commands and limiting them in accordance with respective horsepower command approved ranges and approved change rates; and converting the limited horsepower commands to present torque commands. Maximum horsepower available is determined by using an engine speed to determine a nominal amount of available horsepower; applying a desired load status signal and an actual engine load status signal to a proportional-integral A regulator; and using the nominal amount of available horsepower and an output signal of the regulator to determine the maximum amount of available horsepower. Thermal protection is provided by obtaining component temperatures of a plurality of components; normalizing each component temperature; obtaining a normalized drive system temperature by determining a maximum value of the normalized component temperatures; and comparing the normalized drive system temperature with at least one predetermined maximum normalized temperature and using a result of the comparison to determine whether a corrective action is needed. A truck is started on an incline by determining whether its speed is below a predetermined speed limit, a service brake is applied, and an accelerator pedal is depressed, and, if so, permitting a propulsion torque to build without requiring an operator override action." See Abstract.

SUMMARY

Certain exemplary embodiments can provide for automatic power control and torque boost for retarding a machine that considers a machine weight and a machine slope. The automatic power control and torque boost can provide a control margin under retard. Certain exemplary embodiments can control, or attempt to control, a speed of the machine at less than a maximum safe speed.

Certain exemplary embodiments comprise a method comprising: for a machine comprising a wheel drive system comprising a braking system, comparing an acceleration to a predetermined acceleration threshold; determining a dynamic maximum retard torque associated with the braking system based on said comparing activity; controlling a retard torque to no greater than the dynamic maximum retard torque; and affecting a retard power. Certain exemplary embodiments comprise a method comprising: for a machine comprising a wheel drive system and a braking system, obtaining information indicative of an inclination of the machine with respect to a travel direction of the machine; obtaining an estimated weight related to the machine; and based on the information indicative of an inclination of the machine with respect to a travel direction of the machine of the machine and the estimated weight related to the machine, controlling a retard torque related to the wheel drive system to no greater than a dynamic maximum retard torque.

BRIEF DESCRIPTION OF THE DRAWINGS

A wide variety of potential embodiments will be more readily understood through the following detailed description, with reference to the accompanying drawings in which.

DEFINITIONS

Figure 1:
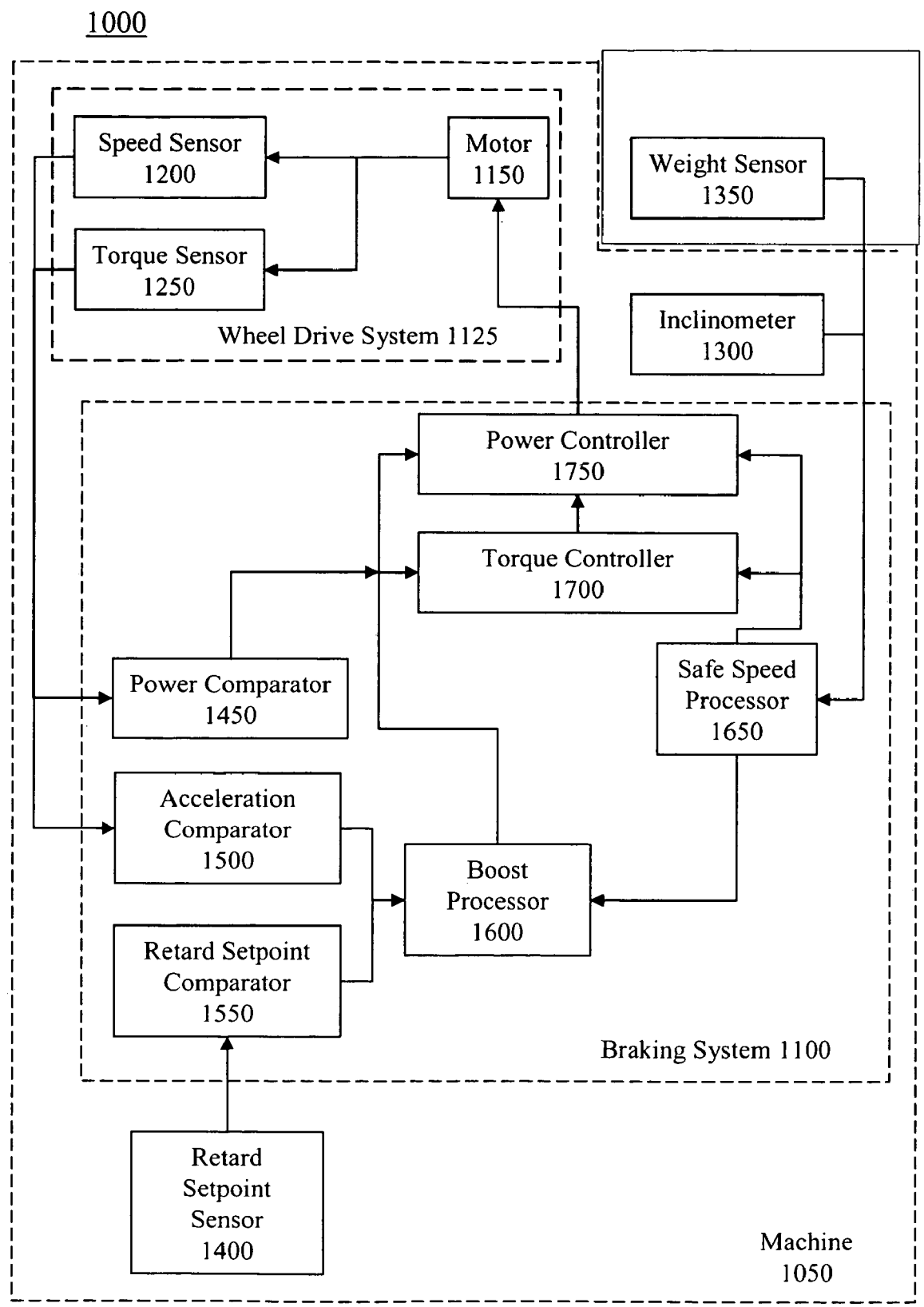
FIG. 1 is a block diagram of an exemplary embodiment of an automatic power control and torque boost system 1000.

When the following terms are used herein, the accompanying definitions apply:

acceleration—a time rate of change in the speed (linear and/or angular) of an entity.

alternating current—an electric current that reverses direction in a circuit at regular intervals.

boost power—a power level associated with retarding a wheel drive system that is above a rated power of at least one electric braking system component. Boost power can be provided temporarily for retarding the wheel drive system.

controller—a device and/or set of machine-readable instructions for performing one or more predetermined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller; parallel controllers, and/or distributed controllers, etc. The controller can be a general-purpose microcontroller, such the Pentium IV series of microprocessor manufactured by the Intel Corporation of Santa Clara, Calif. In another embodiment, the controller can be an Application Specific Integrated Circuit (ASIC) or a Field Programmable Gate Array (FPGA) that has been designed to implement in its hardware and/or firmware at least a part of an embodiment disclosed herein.

control range—an extent within which an operating parameter can be adjusted.

determine—ascertain.

determinator—a device adapted to determine a value.

drive—a means by which power is transmitted to the wheels of a vehicle.

dynamic—changeable.

electrical properties—characteristics of a device and/or system adaptable to use electricity. Electrical properties can relate to a quality and/or quantity of electrical power safely handleable by the device and/or system.

electric motor braking system—a plurality of components adapted to retard, or attempt to retard, motion of an electric motor.

electric motor—a motor powered by electricity. An electric motor can comprise two members, one stationary, called the stator, and the other rotating, called the rotor. Either member can utilize one or more magnets, electromagnets, and/or ferromagnetic components.

expected—predicted.

fail-safe processor—a processor adapted to determine a maximum safe velocity of a machine.

feedback metric—a value output by a system that is used as one of a plurality of inputs to some portion of that system.

Global Positioning System (GPS)—a system adaptable to determine a terrestrial location of a device receiving signals from multiple satellites.

Geographic Information System (GIS)—an information management system tied to geographic data. For example, a GIS can comprise various types of geographical-data sets, such as topography, elevation, buildings, hydrology, road networks, urban mapping, land cover, zoning, and/or demographic data, etc. Data sets in a GIS can be tied together geographically to provide a spatial context.

gross weight processor—a processor adapted to estimate a weight of a machine.

incline—a slope with respect to a horizontal plane.

incline processor—a processor adapted to receive information indicative of an inclination of the machine with respect to a travel direction of the machine.

inclinometer—an instrument for indicating the inclination of a vehicle.

increase—to become greater or more in size, quantity, number, degree, value, intensity, and/or power, etc.

information—data.

input—a signal, data, and/or information provided to a device and/or system.

input processor—a processor adapted to receive information related to at least one wheel drive, the information can comprise a speed, a torque, and/or a power, etc.

instructions—directions adapted to perform a particular operation or function.

level—a relative position on a scale.

limit—a finite extent.

limited range—a finite extent of values.

load metric—a value that describes a maximum allowable amount of energy impartable to an electrical and/or mechanical component of a vehicle.

machine—a device and/or vehicle adapted to perform at least one task.

maximum—a greatest extent.

measurement—a value of a variable, the value determined by manual and/or automatic observation.

metric—a measurement.

metric processor—a processor adapted to calculate at least one load metric related to a rotational speed and a torque associated with a motor.

mine haul truck—a motor vehicle adapted to transport bulk materials.

motion—movement due to rotation and/or translation.

motor—something that converts electricity to linear and/or angular motion.

predetermined—established in advance.

predetermined limit—an extent established in advance.

predetermined acceleration threshold—a limit on a time rate of change in velocity, the limit established in advance.

predetermined period of time—a time interval established in advance.

predetermined retard power limit—an expected amount of power safely handleable by an electrical braking system under retard. The predetermined retard power limit can be related to electrical properties of a motor and/or the electric braking system.

predetermined threshold—a limit established in advance.

processor—a hardware, firmware, and/or software machine and/or virtual machine comprising a set of machine-readable instructions adaptable to perform a specific task. A processor acts upon information by manipulating, analyzing, modifying, converting, transmitting the information to another processor or an information device, and/or routing the information to an output device.

rate—a quantity measured with respect to another quantity.

rated capacity—an expected capability. For example, an electric motor can have an ability to transfer an expected amount of mechanical energy related to an amount of electrical energy provided to the electric motor.

rating—an expected capability.

render—make perceptible to a human, for example as data, commands, text, graphics, audio, video, animation, and/or hyperlinks, etc., such as via any visual and/or audio means, such as via a display, a monitor, electric paper, an ocular implant, a speaker, a cochlear implant, etc.

retard—to attempt to slow; to resist motion.

retard envelope—a predetermined allowable range of torque values related to electrical properties of an electric braking system.

retard metric—a value related to a maximum safe velocity, a predetermined limit, and/or a speed metric.

retard power—electrical power associated with applying a torque in a direction opposite to a direction of travel.

retard processor—a processor adapted to determine a retard power based on a rotational speed and a torque related to a motor.

retard setpoint—a threshold indicative of a desired velocity, deceleration, and/or deceleration rate of the machine. The retard setpoint can be provided by an operator, such as by the operator pressing downward on a retard pedal in a cab of a mine haul truck.

retard torque—a moment of a force applied to slow an object's rotation and/or linear motion in a predetermined direction. Also equivalent to the product of an angular retard deceleration and a mass moment of inertia of an object.

retard torque setpoint—a threshold indicative of a desired retarding torque or deceleration of the machine. The retard setpoint can be provided by an operator, such as by the operator pressing downward on a retard pedal in a cab of a mine haul truck, or by a controller.

retard power setpoint—a threshold indicative of a desired retarding power of the machine provided by a controller.

retard torque—a moment of a force applied in a direction opposite to a direction of an object's motion. Also equivalent to the product of an angular retard deceleration and a mass moment of inertia of an object.

safe—relatively free from risk or danger. A machine can be safe when controllable as to velocity.

speed—a distance traveled during a predetermined time interval. A speed can be translational or rotational in nature.

speed metric—a value related to a rotational speed and/or a torque of a motor associated with a vehicle.

tachometer—an instrument used to measure the rotational speed of a rotating shaft.

temporarily—existing and/or occurring for a limited period of time.

torque—a moment of force acting upon an object; a measure of the force's tendency to produce torsion and rotation in the object about an axis equal to the vector product of the radius vector from the axis of rotation to the point of application of the force and the force vector. Equivalent to the product of angular acceleration and mass moment of inertia of the object.

torque boost processor—a processor adapted to increase a maximum turning force.

torque range processor—a processor adapted to determine an extent of turning forces.

translational—along a linear and/or curvilinear path; non-rotational;

truck—a motorized machine designed for carrying or pulling a primarily non-human load.

user interface—any device for rendering information to a user and/or requesting information from the user. A user interface includes at least one of textual, graphical, audio, video, animation, and/or haptic elements.

value—an assigned or calculated numerical quantity.

vehicle—a device or structure for transporting persons or things. A vehicle can be a car, truck, locomotive, and/or mine haul. truck, etc.

velocity—a translational speed.

weight—a force with which a body is attracted to Earth or another celestial body, equal to the product of the object's mass and the acceleration of gravity.

wheel—a solid disk or a rigid circular ring connected to a hub and designed to turn around an axle.

wheel drive system—a plurality of components by which power is transmitted from an energy source, such as a fossil-fuel powered internal combustion engine, to the wheels of a machine. A wheel drive system can comprise, for example, an engine; a generator and/or alternator; an electric motor; a speed sensor; a torque sensor; a plurality of mechanical power transmission components, such as a clutch, torque converter, transmission, driveshaft, differential, and/or gearbox, etc.; a system controller; an inverter; a variable frequency motor controller; an electrical braking system adapted to generate power from the machine as it retards; and/or an electrical energy dissipation circuit associated with the electrical braking system; etc.

wireless—any means to transmit a signal that does not require the use of a wire or guide connecting a transmitter and a receiver, such as radio waves, electromagnetic signals at any frequency, lasers, microwaves, etc., but excluding purely visual signaling, such as semaphore, smoke signals, sign language, etc.

DETAILED DESCRIPTION

FIG. 1 is a block diagram of an exemplary embodiment of an automatic power control and torque boost system 1000, which can comprise a machine 1050.

Machine 1050 can be, for example, a car, truck, locomotive, and/or haul truck, etc. In certain exemplary embodiments, machine 1050 can comprise a wheel drive system 1125, which can be a single wheel drive system driving a plurality of wheels of the machine. In certain exemplary embodiments, wheel drive system 1125 can be one of a plurality of wheel drive systems driving a plurality of wheels of the machine.

Wheel drive system 1125 can comprise a motor 1150, which can be an alternating current electric motor and/or a direct current electric motor. Motor 1150 can have performance characteristics such as a relationship between a rotational speed and a torque, such as the angular speed and torque of a rotor and/or output shaft of the motor. A curve can be plotted for motor 1150 relating rotational speed to torque. The velocity of machine 1050 can be controlled via controlling a torque associated with motor 1150. Applying a retarding torque and/or power via motor 1150 can provide an opposing torque and/or power to a velocity and/or direction of travel of machine 1050. Applying a retarding torque to machine 1050 can control and/or attempt to be control the velocity of machine 1050, particularly when machine 1050 traverses a downward grade.

A shaft associated with motor 1150 can be coupled to a speed sensor 1200, which can be adapted to provide a rotational frequency and/or angular speed of the shaft. Speed sensor 1200 can be adapted to directly or indirectly measure an actual rotational speed of motor 1150. Speed sensor 1200 can be coupled to motor 1050 mechanically, electro-mechanically, magnetically, and/or optically, etc. For example, a direct contact speed sensor 1200 can sense signals from magnetic brushes to provide a measurement of rotational speed. As another example, an indirect contact speed sensor 1200 can sense an optical signal reflected off of a surface to provide a measurement of rotational speed. Speed sensor 1200 can detect, measure, and/or transmit a speed measurement related to motor 1150 to a processor, such as a power comparator 1450 and/or an acceleration comparator 1500. The rotational speed associated with motor 1150 can be proportional to a power applied to hold and/or move machine 1050. In certain exemplary embodiments, speed sensor 1200 can measure a rotational speed of a component of wheel drive system 1125 that is driven by motor 1150, and/or a translational (e.g., linear, curvilinear, etc.) speed of machine 1050.

The translation speed of machine 1050 represents a rate of change in position of machine 1050 in a direction of travel relative to a reference point over a predetermined time interval. The translation speed can be reported in, for example, feet per second, kilometers per hour, and/or miles per hour, etc. The rotational speed of a component of wheel drive system 1125 can be a rate at which the component rotates in a predetermined time and/or an angular speed of the component representing a rate of change in a rotational position of the shaft relative to a reference point over a predetermined period of time. The rotational speed can be reported in, for example, revolutions per second, revolutions per minute, revolutions per hour, degrees per second, degrees per minute, radians per second, and/or radians per minute, etc. The translation speed associated with a linear and/or curvilinear motion of machine 1050 can be converted to the rotational speed and vice versa.

System 1000 can comprise a torque sensor 1250, which can measure a torque related to motor 1150. For example, torque sensor 1250 can measure torque utilizing a strain gauge, an angular accelerometer, a dynamometer, and/or by measuring an electrical property such as a two-phase current transformation in conjunction with a two-phase flux transformation to calculate instantaneous torque, frequency, slip-speed, and/or phase shift, etc. Torque sensor 1250 can detect, measure, and/or transmit information indicative of a torque related to motor 1150 to a processor, such as power comparator 1450. The torque associated with motor 1150 can be considered as proportional to a force applied to hold and/or move machine 1050. The torque associated with motor 1150 can be proportional to the power applied to hold and/or move machine 1050. In certain exemplary embodiments, torque sensor 1250 can measure a torque applied to a component of wheel drive system 1125 that is driven by motor 1150, and/or a translation (e.g., linear) force of machine 1050.

An inclinometer 1300 can be comprised by and/or in machine 1050 and/or system 1000. Inclinometer 1300 can be adapted to measure an angle of incline associated with machine 1050. Inclinometer 1300 can provide information indicative of machine 1050 traversing a gradient such as a downhill gradient. Inclinometer 1300 can measure a slope via a device based on an accelerometer, capacitance, electrolysis, gas bubble in liquid, mercury, and/or pendulum, etc. Accelerometers can measure, display, and/or analyze acceleration and vibration associated with a gradient related to machine 1050. Capacitive tilt sensors can take non-contact measurements of tilt and inclination of machine 1050. Electrolytic tilt sensors can produce pitch and roll measurements related to machine 1050. A gas bubble in liquid can be comprised of a sight glass filled with liquid adapted to measure an incline associated with machine 1050. A mercury type tilt sensor can comprise a small metal or glass can, inside of which are two electrodes and a minute drop of mercury adapted to measure an incline associated with machine 1050. A pendulum type sensor can comprise a pendulum or weight in conjunction with a rotary sensor adapted to measure an incline associated with machine 1050. In certain exemplary embodiments, an inclinometer, such as a laser-based optical inclinometer, can be positioned outside machine 1050 to determine the incline of machine 1050 and/or any portion thereof.

In certain exemplary embodiments, inclinometer 1300 can be adapted to wirelessly obtain information related to the incline of machine 1050. For example, inclinometer 1300 can obtain information indicative of location from a GPS-based device and/or a GIS device, etc. Inclinometer 1300 can obtain information indicative of terrain slopes from an engineering entity, the USGS, and/or a commercial surveying entity, etc. Inclinometer 1300 can be communicatively coupled to a safe speed processor 1650. Information measured, obtained, and/or determined using inclinometer 1300 can be wirelessly transmitted to at least one transceiver.

A weight sensor 1350 can be comprised by and/or in machine 1050 and/or system 1000. Weight sensor 1350 can be adapted to detect a weight related to machine 1050. Weight sensor 1350 can be a strain gauge, load cell, nuclear based weight sensor, and/or electrical sensor detecting a parameter related to weight, etc. Weight sensor 1350 can be communicatively coupled to safe speed processor 1650. In certain exemplary embodiments, a weight sensor 1350, such as a traditional scale, can be positioned outside machine 1050 to determine the weight of machine 1050 and/or any portion thereof. In certain exemplary embodiments, weight sensor 1350 can be adapted to wirelessly obtain information related to the weight of machine 1050. Information measured, obtained, and/or determined using weight sensor 1350 can be wirelessly transmitted to at least one transceiver.

Motor 1150 can be controllable via braking system 1100, which can be adapted to control the retard torque and/or power related to motor 1150 responsive to a plurality of inputs and/or conditions. Braking system 1100 can comprise power comparator 1450, acceleration comparator 1500, a retard setpoint comparator 1550, a boost processor 1600, safe speed processor 1650, a torque controller 1700, and/or a power controller 1750.

Power comparator 1450 can calculate an actual power from measurements provided by, for example, speed sensor 1200 and torque sensor 1250. Power comparator 1450 can calculate power on a discrete and/or time averaged basis. Power comparator 1450 can be adapted to compare the actual power to a rated power associated with braking system 1100. Under retard, the rated power can be related to an ability of a mechanical and/or electrical component of braking system 1100 to dissipate heat and/or transfer electrical energy without overheating. For example, if motor 1150 is an alternating current electric motor, the rated retard power can be limited by the windings of motor 1150, a component related to a speed controller associated with motor 1150, a grid box (e.g. a system which is used for dissipating power generated by a motor under retard), and/or an electrical wire transmitting power to motor 1150, etc. Power comparator 1450 can be adapted to provide a feedback metric related to the actual power and a rated power of at least one wheel drive to torque controller 1700 and/or power controller 1750.

Acceleration comparator 1500 can be adapted to receive a speed measurement from a device such as speed sensor 1200, and/or derive a speed measurement from a torque measurement provided by a device such as torque sensor 1250. Acceleration comparator 1500 can calculate an acceleration associated with machine 1050, such as an angular and/or translational acceleration of machine 1050, via comparing a first translational or rotational speed measured at a first time to a second translational or rotational speed measured at a second time. Acceleration comparator 1500 can be adapted to average accelerations of a plurality of wheel drives of machine 1050, average accelerations related to machine 1050 over a predetermined time period, and/or compare an acceleration of machine 1050 to a predetermined threshold. The predetermined threshold can be, for example, approximately 0.05 m/s, 0.1 m/s$^2$, 0.123 m/s$^2$, 0.2 m/s$^2$, 0.211 M/s$^2$, 0.43 m/s$^2$, 0.576 m/s$^2$, and/or any acceleration value above, below, or in between those values. Comparing the acceleration to a predetermined threshold can provide a signal adaptable to adjust a dynamic maximum torque associated with torque controller 1700 and/or power controller 1750.

Machine 1050 can comprise a retard setpoint sensor 1400. Retard setpoint sensor 1400 can be adapted to detect a measurement indicative of a retard setpoint. The retard setpoint can relate to a requested amount of retard from an operator of machine 1050. The retard setpoint can be proportional to a retard pedal depression by the operator of machine 1050. Retard setpoint sensor 1400 can be communicatively coupled to retard setpoint comparator 1550.

Retard setpoint comparator 1550 can be adapted to compare the retard setpoint associated with retard setpoint sensor 1400 to a predetermined threshold. Retard setpoint comparator 1550 can provide a retard setpoint metric to boost processor 1600. For example, if the retard setpoint requests a maximum retarding torque for a predetermined time period, the retard setpoint metric supplied by retard setpoint comparator 1550 can provide a signal to boost processor 1600 indicative of a request for a higher dynamic maximum torque.

Electric braking system 1100 can comprise a safe speed processor 1650, which can provide a maximum safe speed and/or a speed metric indicative of a maximum safe speed to torque controller 1700 and/or power controller 1750. Safe speed processor 1650 can be adapted to calculate and/or determine the maximum safe speed responsive to information obtained from inclinometer 1300 and/or weight sensor 1350. For example, when machine 1050, having a weight sensed by weight sensor 1350, traverses a downhill grade of a slope detected by inclinometer 1300, the maximum-safe speed can represent a speed above which machine 1050 would be, or would be at risk of being, in an uncontrollable condition, such as when insufficient retard and/or braking power exists to slow the machine to a safe translational speed for a given incline. Safe speed processor 1650 can provide the maximum safe speed to torque controller 1700 and/or power controller 1750, which can be indicative of a speed below which torque controller 1700 and/or power controller 1750 should control and/or attempt to control machine 1050. Safe speed processor 1650 can provide a signal adapted to render the maximum safe speed on a user interface. The maximum safe speed can be dynamic and change with respect to load, location, incline, and/or machine weight.

Boost processor 1600 can be adapted to receive information from a plurality of information devices such as acceleration comparator 1500 and/or retard setpoint comparator 1550. Responsive to a signal indicative of retard setpoint comparator 1500 requesting a value increase in the dynamic maximum torque, and/or signal indicative of a continued acceleration of machine 1050 above a predetermined rate from acceleration rate comparator 1500, boost processor 1600 can be adapted to provide instructions to increase a value of the dynamic maximum retard torque and/or power associated with torque controller 1700 and/or power controller 1750.

Torque controller 1700 can be adapted to provide a signal to control a retard torque generated by motor 1150. A retard torque generated by motor 1150 can restrain, and/or or attempt to restrain, an acceleration and/or speed of machine 1050.

Torque controller 1700 can accept input signals, for example, from power comparator 1450, boost processor 1600, and/or safe speed processor 1650, etc. Torque controller 1700 can be adapted to provide an output signal to a device related to motor 1150. The output signal from torque controller 1700 can be based on a proportional, integral, and/or derivative control algorithm in comparing at least one input signal to a value indicative of a setpoint. Torque controller 1700 can provide the output signal responsive to the feedback metric provided by power comparator 1450, gradient provided by inclinometer 1300, weight provided by weight sensor 1350, actual retard torque provided by torque sensor 1250, and/or retard torque limit, etc. A dynamic maximum torque can limit the signal indicative of the retard torque from torque controller 1700. The dynamic maximum torque can be changed responsive to a signal from boost processor 1600. The outputs signal can be based, for machine 1050, on the gradient, weight, actual retard torque, and/or retard torque limit, etc.

Power controller 1750 can accept input signals, for example, from torque controller 1700, power comparator 1450, boost processor 1600, and/or safe speed processor 1650, etc. Power controller 1700 can be adapted to provide an output signal to a device related to motor 1150. The output signal from power controller 1700 can be based on a proportional, integral, and/or derivative control algorithm in comparing at least one input signal to a value indicative of a setpoint. Applying a retard power from motor 1150 can restrain, and/or or attempt to restrain, an acceleration and/or speed of machine 1050. Power controller 1700 can provide the output signal responsive to the feedback metric provided by power comparator 1450, gradient provided by inclinometer 1300, weight provided by weight sensor 1350, actual retard torque provided by torque sensor 1250, and/or retard torque limit, etc. A dynamic maximum power can limit the signal indicative of the retard power from power controller 1700. The dynamic maximum power can be changed responsive to a signal from boost processor 1600.

Output signals from torque controller 1700 and/or power controller 1750 can be constrained by the dynamic maximum torque and/or power. Under normal retarding operation, a retarding torque and/or power can be applied to motor 1050 with the dynamic maximum torque and/or power set at a first dynamic maximum torque and/or power that is less than a rated maximum torque and/or power associated with a braking system 1100. For example, the first dynamic maximum torque and/or power can be, as a percentage of the rated maximum torque and/or power associated with braking system 1100, approximately 68, 69.5, 70.25, 80.01, 83.2, 85, 87.433, 88, 89.9, or 90.32, etc. or any value above, below, or in between these values.

Controlling machine 1050 utilizing a dynamic maximum torque and/or power can assist in a safe operation of machine 1050. In certain exemplary embodiments, torque controller 1700 and/or power controller 1750 can provide a signal to a device related to motor 1150 indicative of a retard torque and/or power below, approaching or equal to the first dynamic maximum value.

Pursuant to a predetermined set of conditions, a value of the dynamic maximum torque and/or power can be changed, via boost processor 1600. For example, the second dynamic maximum torque and/or power can be higher and/or lower than the first dynamic maximum torque and/or power. The value of the dynamic maximum torque and/or power can be increased responsive to a determination of a need to further retard the motion of machine 1050, or decreased responsive to a determination of a lack of need to further retard the motion of machine 1050. The second maximum torque and/or power can be, as a percentage of the rated maximum torque and/or power associated with braking system 1100, such as approximately 95, 96.5, 97.25, 99.09, 99.9, 100, 100.133, 101.88, 102.9, or 103.37, 105, etc. percent, or any value above, below, or in between these values.

Responsive to a signal from boost processor 1600, a value of the dynamic maximum torque and/or power can be increased from the first dynamic maximum to the second dynamic maximum when the signal approaches and/or reaches the first dynamic maximum, and machine 1050 is still accelerating and/or additional retarding is desired. In certain exemplary embodiments, torque controller 1700 and/or power controller 1750 can provide a signal to a device related to motor 1150 indicative of a retard torque and/or power up to, approaching, or approximately equal to the second dynamic maximum.

On a short term basis a value of the dynamic maximum torque and/or power can be boosted to a third maximum torque and/or power. The third maximum torque and/or power can be above the rated maximum torque and/or power associated with braking system 1100. The third maximum torque and/or power can be, as a percentage of the rated maximum torque and/or power associated with braking system 1100, approximately 110, 111.5, 113.25, 114.09, 114.9, 115, 117.133, 118.88, 119.9, or 120.37, etc. percent, or any value above, below, or in between these values. The third dynamic maximum torque and/or power can be used as the dynamic maximum torque for a predetermined period of time. The predetermined period of time in seconds can be, for example, 1, 2.344, 3.1, 7.68, 8, 9.254, 15, 20.225, 31, 45.901, and/or 60.13, etc., seconds, and/or any value above, below, or in between these values.

Responsive to a signal from boost processor 1600, a value of the dynamic maximum torque and/or power can be increased to the third dynamic maximum when the signal approaches and/or reaches the second dynamic maximum, and machine 1050 is still accelerating and/or additional retarding is desired. On a short term basis, torque controller 1700 and/or power controller 1750 can provide a signal to motor 1150 indicative of a dynamic maximum retard torque and/or power up to the third dynamic maximum.

The rotational speed of motor 1150 and/or velocity of machine 1050 corresponding to a dynamic maximum torque and/or power can depend on a gross machine weight (measurable utilizing weight sensor 1350) and/or an incline of a grade being traversed by the machine (measurable utilizing inclinometer 1300). Torque controller 1700 and/or power controller 1750 can limit the angular and/or translational speed of machine 1050. In a power region of a retard curve associated with motor 1150, the retard pedal position, the retard torque, and the retard power can all be proportional.

Figure 2:
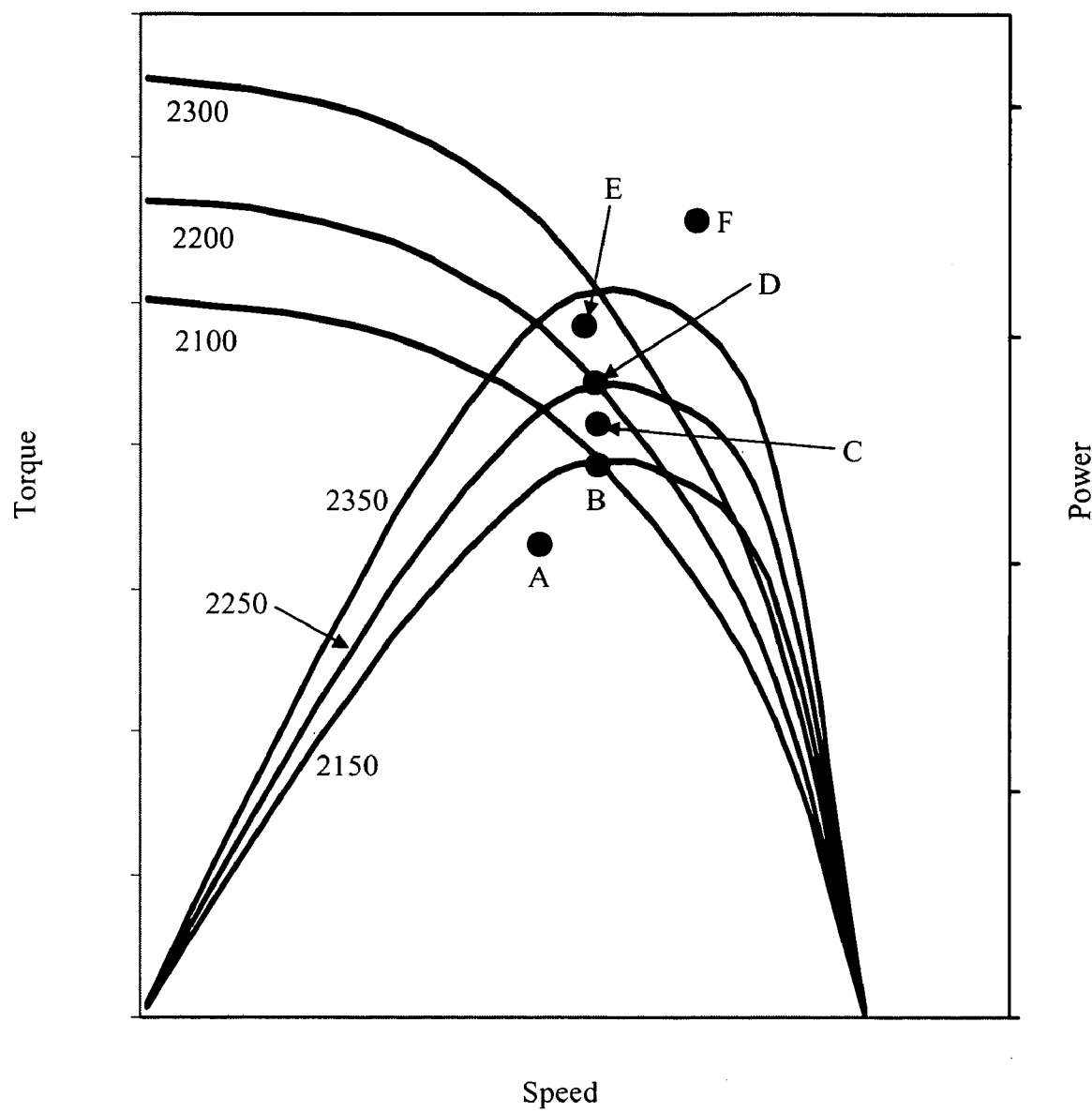
FIG. 2 is a diagram of an exemplary set of torque/speed curves 2000.

FIG. 2 is a diagram of an exemplary set of torque/speed curves 2000. Certain exemplary embodiments comprise dynamic maximum torque and/or power levels as described in Table 1:

TABLE 1

| Dynamic Maximum Retard Torque and/or Power | Description | Explanation |
|---|---|---|
| 88% | First Dynamic Maximum Torque | Continuous retard with safety limit |
| 100% | Second Dynamic Maximum Torque | Increased limit to provide additional retarding torque and/or power for steep grades and/or heavy loads |
| 115% | Third Dynamic Maximum Torque | Short-term assist in recovery from an over speed condition |

Exemplary values of the dynamic maximum retard torque and/or power limits, expressed as a percentage of rated retard torque and/or power, as indicated in Table 1 can provide margins for control during retard. A value of the dynamic maximum retard torque and/or power limit for normal operation can be set to approximately 88% of a rated retard power as the first dynamic maximum retard torque. The torque/speed curve associated with the first dynamic maximum retard torque as a value of dynamic maximum torque from Table 1 can be graphically illustrated as curve 2100. The power/speed curve associated with the first dynamic maximum retard torque as a value of dynamic maximum torque from Table 1 can be graphically illustrated as curve 2150. The torque/speed curve associated with the second dynamic maximum retard torque as a value for the dynamic maximum torque from Table 1 can be graphically illustrated as curve 2200. The power/speed curve associated with the second dynamic maximum retard torque as a value for the dynamic maximum torque from Table 1 can be graphically illustrated as curve 2250. The torque/speed curve associated with the third dynamic maximum retard torque as a value of the dynamic maximum torque from Table 1 can be graphically illustrated as curve 2300. The power/speed curve associated with the third dynamic maximum retard torque as a value of the dynamic maximum torque from Table 1 can be graphically illustrated as curve 2350.

For example, consider a truck with two traction motors and a weight of approximately one million pounds comprising a wheel drive with a retard system with a 3500 kilowatt power limit. If the truck descends a ten-percent grade with a rolling resistance of two percent at 19 miles per hour, approximately 3100 kilowatts of retard power are required to maintain the velocity of the truck and to avoid acceleration. Operating at about 3100 kilowatts corresponds to a torque approximating the first dynamic maximum retard torque value for the dynamic maximum retard torque of 88% of the retard power limit of 3500 kilowatts. In certain exemplary embodiments, additional retarding torque can be available to slow the truck responsive to a predetermined set of conditions. Certain exemplary embodiments can be adapted to maintain the velocity of the truck within a predetermined velocity range during minor variations in grade.

In certain exemplary embodiments, when the truck is operating at a retard torque below the first dynamic maximum retard torque value and the retard pedal input is less than a predetermined threshold, the truck may accelerate without an applied retard torque (e.g., to reach the desired/rated downhill velocity). An exemplary situation A on FIG. 2 illustrates this condition. Situations such as situation A can comprise any of a plurality of conditions that can reflect any of many combinations of gross truck-weight; incline, traction, path curvature, and/or velocity of the machine and/or motor, machine and/or drivetrain inertia, retard pedal position, propel pedal position, etc. Situation A can be any set of conditions resulting in a speed/torque and speed/power relationship in a particular speed/torque/power state space.

When the retard pedal input exceeds a predetermined threshold indicative of an operator attempting to slow the truck, the retard torque can be increased accordingly. The grade traversed by the truck can increase or the velocity of the truck can increase and cause the retard torque to reach the dynamic maximum retard torque limit (88% of the rated retard torque and/or power in the example above) of curve 2100 and/or curve 2150. This can be shown graphically as situation B on FIG. 2.

As needed, the value of the dynamic maximum retard torque can be automatically increased above 3100 kilowatts up to the second dynamic maximum torque and/or power (100% of the rated retard torque and/or power in this embodiment), illustrated as curve 2200 and/or curve 2250. The value of the dynamic maximum retard torque and/or power limit can remain elevated at the second dynamic maximum until the actual torque level once again approaches and/or reaches 88% of the rated retard torque. Increasing the retarding torque can slow and/or attempt to slow the truck down. Thus, the torque and rotational speed associated with a motor associated with the truck can traverse, for example, to situation C on FIG. 2 responsive to increasing the value of the dynamic maximum torque limit.

In certain exemplary embodiments, the dynamic retard torque limit defined by curve 2200, and the dynamic retard power limit defined by curve 2250, can be reached as illustrated by situation D on FIG. 2. A change from situation C to situation D can be indicative of the truck velocity not sufficiently decreasing despite a torque and/or power increase up to the continuous duty maximum level.

To accommodate such scenarios in certain exemplary embodiments, the value of the dynamic maximum retard torque and/or power limit can be temporarily boosted to the third dynamic maximum (approximately 115% of the rated retard torque in this embodiment), graphically shown as torque curve 2300 and power curve 2350. The third dynamic maximum (boost function) can be activated when the retard pedal is fully activated, the truck is accelerating, and/or the boost function has not been applied for a predetermined period of time, etc.

The value of the dynamic maximum retard torque can be limited by the short-term electrical carrying capacity of a grid box associated with an electric motor associated with the truck braking system. The time interval for applying the third dynamic maximum retard torque and/or power can be set to a maximum time interval, such as 20 seconds, and/or until the retard torque and/or power is less than the first dynamic maximum (88% of the rated retard torque in this embodiment) as illustrated by curve 2100.

A warning indicator can prompt an operator of the truck when the value of the dynamic maximum retard torque is increased. In the example above, the additional 15% retard torque can increase the safe operating velocity for the truck to 24 mph. In certain exemplary embodiments, the rotational speed and torque of the motor associated with the truck can reach, for example, situation E on FIG. 2. Traversing from situation D to situation E can be indicative of an increase in torque.

In certain exemplary embodiments, the rotational speed, torque, and/or power associated with a motor associated with the truck can result in situation F, which can be indicative of a condition where the truck velocity cannot be controlled by the retard system. Situation F illustrates a situation where the truck will continue to gain velocity absent some other force, such as an emergency friction based braking system, decrease in inclination, and/or collision of the truck, etc.

In certain exemplary embodiments, the value of the dynamic maximum retard torque and/or power can be reduced back to the first dynamic maximum retard torque and/or power level as the torque approaches and/or reaches the first dynamic maximum retard torque and/or power level.

Figure 3:
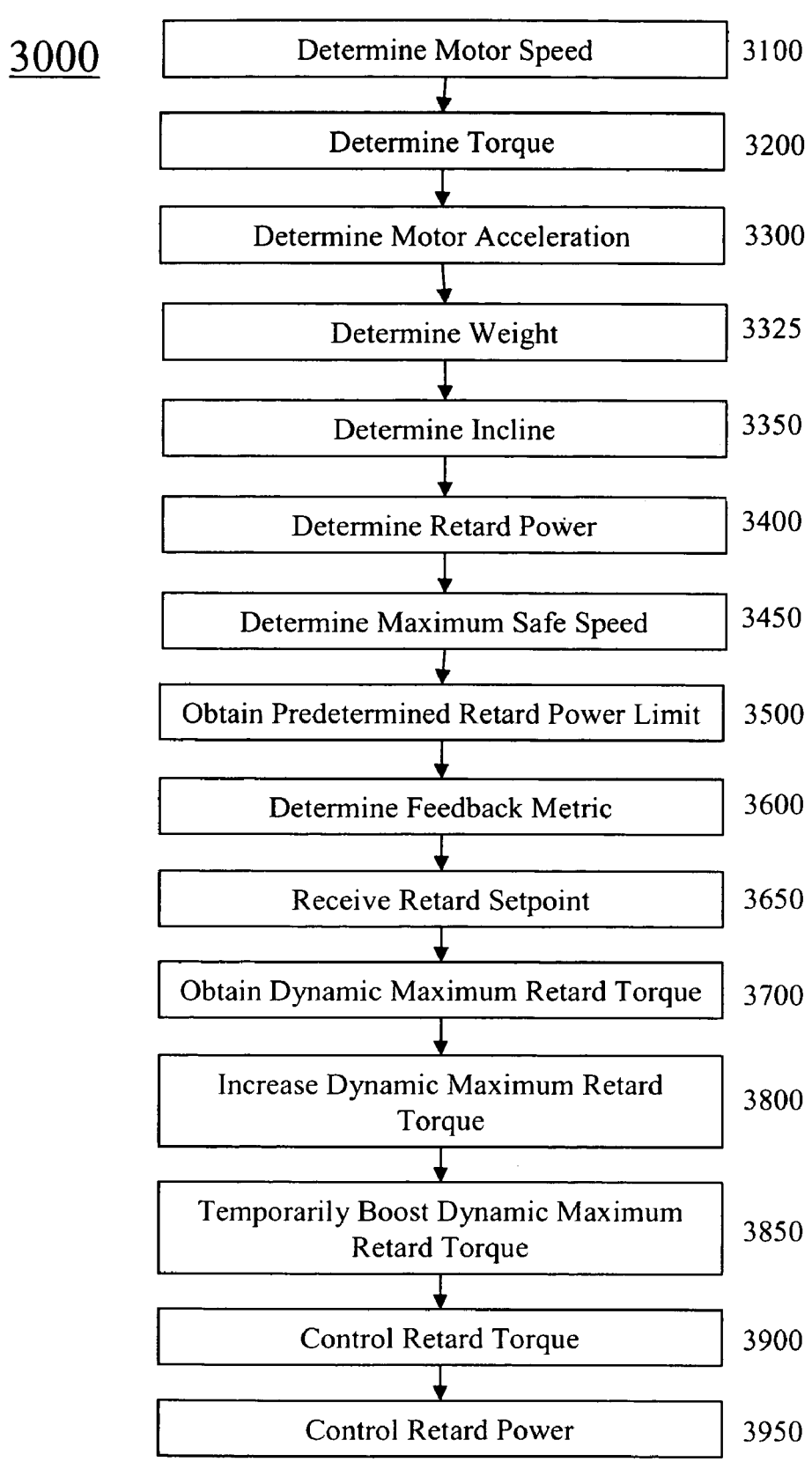
FIG. 3 is a flow diagram of an exemplary embodiment of an automatic power control and torque boost method 3000.

FIG. 3 is a flow diagram of an exemplary embodiment of an automatic power control and torque boost method 3000, which can be associated with a machine comprising a wheel drive system and a wheel drive braking system. At activity 3100, a rotational speed related to a motor associated with the wheel drive system can be measured directly, calculated, and/or determined. The rotational speed related to the motor can be used to determine a power associated with the motor.

At activity 3200, a torque related to a motor associated with the wheel drive system can be measured directly, calculated, and/or determined. The torque related to the motor can be used to determine a power associated with the motor.

At activity 3300, the acceleration of the motor associated with the wheel drive system can be determined by, for example, comparing rotational speeds associated with the motor and/or wheel drive at different times.

At activity 3325, a weight related to the machine can be determined. The weight related to the machine can be a gross weight of the machine, a weight of any portion thereof, and/or a net weight of a load held by the machine, etc. In certain exemplary embodiments, the weight related to the machine can be measured utilizing a sensor and/or measurement associated with the machine. In certain exemplary embodiments, the weight can be detected by a sensor and/or measurement external to the machine and communicated wirelessly to the machine.

At activity 3350, an incline related to the machine can be determined. The incline related to the machine can be an incline of the entire machine, and/or an incline of any portion thereof, etc. In certain exemplary embodiments, the incline related to the machine can be measured utilizing a sensor and/or measurement associated with the machine. In certain exemplary embodiments, the incline can be detected by a sensor and/or measurement external to the machine and communicated wirelessly to the machine.

At activity 3400, a retard power can be determined, for example, via a calculation based upon the rotational speed and torque related to the motor. The retard power can be used to determine and/or calculate a feedback metric usable in controlling the motor.

At activity 3450, a maximum safe velocity of the machine can be determined. For example, the maximum safe velocity of the machine can be determined based on the weight of the machine and/or the incline of the machine. The maximum safe velocity can represent a velocity above which the machine would be, or would be at risk of being, in an uncontrollable condition, such as when insufficient retard and/or braking power exists to slow the machine to a safe velocity for a given downhill incline. The maximum safe velocity can be dynamic in nature and can change with respect to load, location, incline, and/or machine weight, etc. In certain exemplary embodiments, the maximum safe velocity can be rendered via a user interface. The user interface can be viewable, for example, by an operator of the machine, supervisor of an operator of the machine, dispatcher associated with the machine, manager of the machine, and/or any other person responsible for a safe operation of the machine, etc.

At activity 3500, a predetermined retard power limit can be obtained and/or determined. For example, the retard power or torque limit can be obtained from electrical system calculations used in designing the machine. The retard power or torque limit can be associated with a braking system capacity. The braking system capacity can be related to a mechanical and/or an electrical property of the braking system. For example, for a drive comprising an electric motor, the retard power or torque limit can be related to motor winding size, electrical wiring supplying power to the motor, grid box design, and/or power dissipation limitations in a variable frequency drive, etc.

At activity 3600, a feedback metric can be determined. The feedback metric can be determined based upon at least one actual power and/or torque associated with the motor and/or the maximum safe velocity of the machine. The actual power and/or torque can be calculated from the motor rotational speed and/or the torque related to the motor. In certain exemplary embodiments, the feedback metric can be determined responsive to a comparison between the actual power and/or torque and the predetermined retard power and/or torque limit associated with the machine. In certain exemplary embodiments, the feedback metric can be determined responsive to a comparison between the maximum safe velocity of the machine can be compared to an actual velocity of the machine.

At activity 3650, a retard setpoint can be received from, for example, a foot pedal position provided by an operator of the machine. In certain exemplary embodiments, the retard setpoint can be provided automatically responsive to a machine weight and a slope being traversed by the machine.

At activity 3700, a dynamic maximum retard torque and/or power can be obtained. The dynamic maximum retard torque and/or power can be obtained, responsive to a control algorithm related to the machine. The control algorithm can comprise operating under normal conditions at a first dynamic maximum retard torque and/or power, which is at a level below the retard torque and/or power limit.

At activity 3800, the dynamic maximum retard torque and/or power can be increased. The control algorithm can comprise increasing the dynamic maximum retard torque and/or power to a second dynamic maximum retard torque and/or power. The second dynamic maximum retard torque and/or power can be at a level that is approximately equal to the retard torque and/or power limit. Increasing the dynamic maximum retard torque and/or power can be responsive to at least one pre-determined condition. The at least one predetermined condition can comprise detecting a continued acceleration while retarding up to the first dynamic maximum retard torque and/or power, a maximum retard setpoint, and/or exceeding a maximum safe velocity, etc.

At activity 3850, the dynamic maximum retard torque and/or power can be temporarily boosted. The dynamic maximum retard torque and/or power can be temporarily increased to a third dynamic maximum retard torque and/or power, which can be above the retard torque and/or power limit associated with the machine's braking system. The third dynamic maximum retard torque and/or power can be applied for a predetermined time period. Boosting the dynamic maximum retard torque and/or power can be responsive to at least one pre-determined condition. The at least one predetermined condition can comprise detecting a continued acceleration while retarding up to the second dynamic maximum retard torque and/or power, a maximum retard setpoint, exceeding a maximum safe velocity, and/or a time elapsed since a previous change in the dynamic maximum retard torque and/or power.

At activity 3900, the retard torque can be controlled. The retard torque can be controlled responsive to a torque controller output. The torque controller output can be determined responsive to the feedback metric, the retard setpoint, an incline of the machine, a weight associated with the machine, the maximum safe velocity, and/or the dynamic maximum retard torque, etc.

At activity 3950 the retard power can be controlled. In certain exemplary embodiments, the retard power can be controlled indirectly via controlling the retard torque. In certain exemplary embodiments, the retard power can be controlled responsive to a power controller output. The power controller output can be determined responsive to the retard controller output, the feedback metric, the retard setpoint, an incline of the machine, a weight associated with the machine, the maximum safe velocity, and/or the dynamic maximum retard torque, etc.

Figure 4:
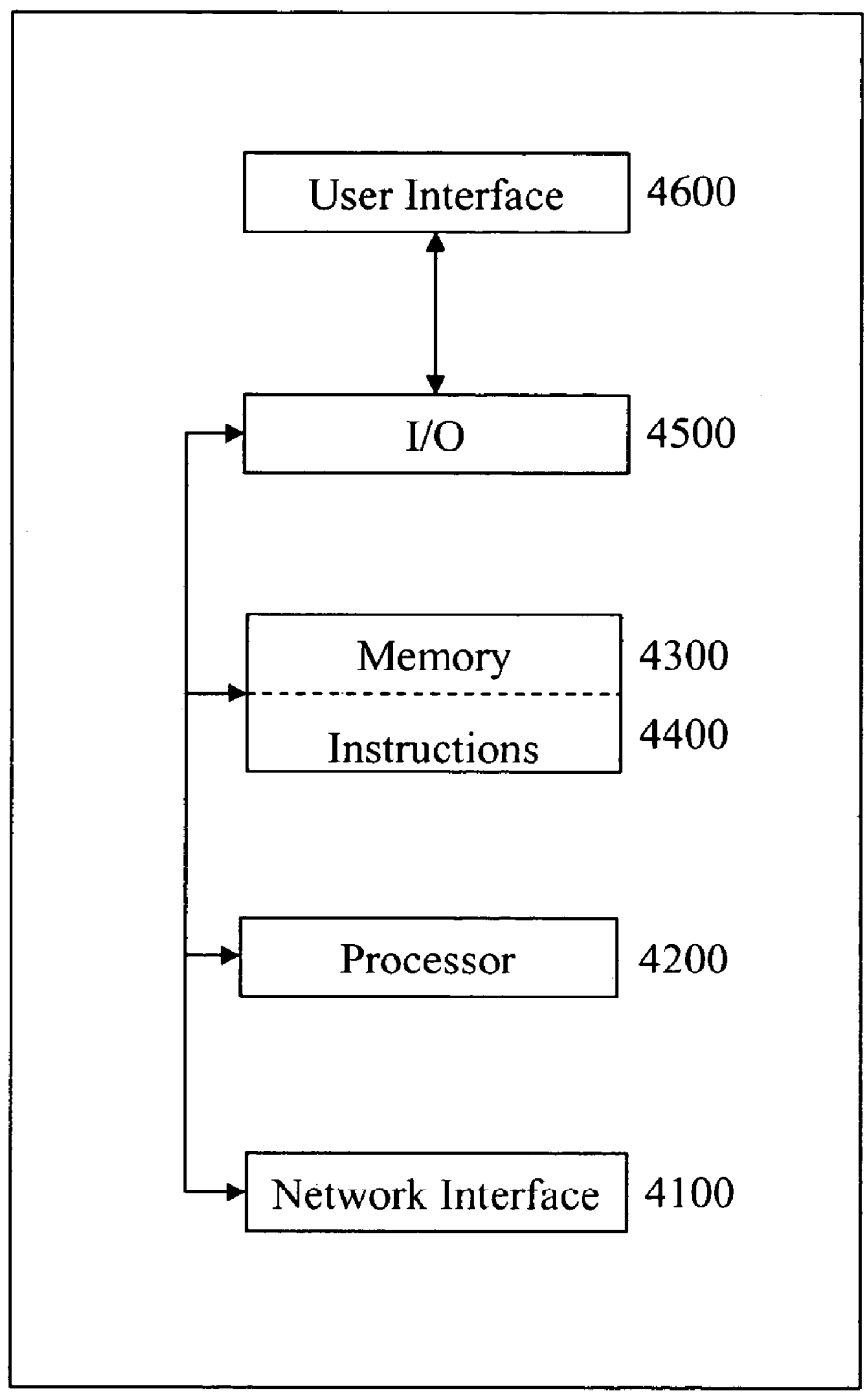
FIG. 4 is a block diagram of an exemplary embodiment of an information device 4000.

FIG. 4 is a block diagram of an exemplary embodiment of an information device 4000, which in certain operative embodiments can comprise, for example, power comparator 1450, acceleration comparator 1500, retard setpoint comparator 1550, boost processor 1600, safe speed processor 1650, torque controller 1700, and/or power controller 1750 of FIG. 1. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to providing automatic power control, fail safe speed control, and/or a torque boost.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method comprising a plurality of activities, comprising:
    for a machine comprising a wheel drive system comprising an electric motor and an electric motor braking system, obtaining information indicative of an inclination of the machine with respect to a travel direction of the machine;
    obtaining an estimated weight related to the machine;
    based on the information indicative of the inclination of the machine with respect to a travel direction of the machine of the machine and the estimated weight related to the machine, controlling a retard torque of the electric motor to no greater than a dynamic maximum retard torque;
    affecting a retard power of the electric motor.

2. The method of claim 1, further comprising:
    determining a dynamic maximum safe speed for the machine based on the inclination of the machine with respect to a travel direction of the machine and the estimated weight related to the machine.

3. The method of claim 1, further comprising:
    rendering a dynamic maximum safe speed via a user interface, the dynamic maximum safe speed determined based on the inclination of the machine with respect to a travel direction of the machine and the estimated weight related to the machine.

4. The method of claim 1, further comprising:
    measuring a speed of the machine.

5. The method of claim 1, wherein said controlling activity is also based on a difference between a speed of the machine and a dynamic maximum safe speed of the machine.

6. The method of claim 1, further comprising:
    receiving a measurement of the retard torque of the electric motor.

7. The method of claim 1, further comprising:
    receiving a measurement of a speed of the electric motor.

8. The method of claim 1, wherein said controlling activity is also based on a retard power related to a speed and the retard torque of the electric motor.

9. The method of claim 1, further comprising:
    receiving a predetermined retard power limit related to the electric motor.

10. The method of claim 1, wherein said controlling activity is also based on a predetermined retard power limit related to the electric motor.

11. The method of claim 1, wherein the machine comprises an inclinometer adapted to provide the information indicative of the inclination of the machine with respect to the travel direction of the machine.

12. The method of claim 1, further comprising:
    wirelessly obtaining information indicative of the inclination of the machine with respect to the travel direction of the machine.

13. The method of claim 1, further comprising:
    wirelessly transmitting information indicative of the inclination of the machine with respect to the travel direction of the machine.

14. The method of claim 1, wherein the information indicative of the inclination of the machine with respect to the travel direction of the machine is obtained responsive to information indicative of a location obtained from a GPS.

15. The method of claim 1, wherein the information indicative of the inclination of the machine with respect to the travel direction of the machine is obtained responsive to information indicative of a location obtained from a GIS.

16. The method of claim 1, further comprising:
    determining the dynamic maximum retard torque based on a maximum safe speed of the machine.

17. The method of claim 1, further comprising:
    determining the dynamic maximum retard torque based on a difference between an actual speed of the machine and a maximum safe speed of the machine.

18. The method of claim 1, further comprising:
    determining the dynamic maximum retard torque based on a comparison of an acceleration rate of the electric motor to a predetermined threshold.

19. The method of claim 1, wherein the dynamic maximum retard torque is less than a rated capacity related to an electric braking system.

20. The method of claim 1, wherein the dynamic maximum retard torque is approximately equal to a rated capacity related to an electric braking system.

21. The method of claim 1, wherein the dynamic maximum retard torque is above a rated capacity related to an electric braking system.

22. The method of claim 1, wherein the machine is a truck.

23. The method of claim 1, wherein the machine is a mine haul truck.

24. A system comprising:
    for a machine comprising a wheel drive system comprising an electric motor and an electric motor braking system, an incline processor adapted to obtain information indicative of an inclination of the machine with respect to a travel direction of the machine;
    a weight processor adapted to obtain an estimated weight related to the machine; and
    based on the information indicative of the inclination of the machine with respect to the travel direction of the machine of the machine and the estimated weight related to the machine, a torque controller adapted to control a retard torque of the electric motor to no greater than a dynamic maximum retard torque.

25. A machine-readable medium comprising stored instructions for:
    for a machine comprising a wheel drive system comprising an electric motor and an electric motor braking system, obtaining information indicative of an inclination of the machine with respect to a travel direction of the machine;
    obtaining an estimated weight related to the machine;
    and based on the information indicative of the inclination of the machine with respect to the travel direction of the machine and the estimated weight related to the machine, controlling a retard torque of the electric motor to no greater than a dynamic maximum retard torque.

* * * * *